United States Patent
Yang et al.

(10) Patent No.: US 10,349,278 B2
(45) Date of Patent: Jul. 9, 2019

(54) METHOD FOR ACCESSING LTE NETWORK, ELECTRONIC DEVICE, AND COMPUTER STORAGE MEDIUM

(71) Applicant: Sanechips Technology Co., Ltd., Shenzhen, Guangdong (CN)

(72) Inventors: Yun Yang, Shenzhen (CN); Jianwei He, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 216 days.

(21) Appl. No.: 15/503,436

(22) PCT Filed: Dec. 22, 2014

(86) PCT No.: PCT/CN2014/094524
§ 371 (c)(1),
(2) Date: Feb. 13, 2017

(87) PCT Pub. No.: WO2015/117514
PCT Pub. Date: Aug. 13, 2015

(65) Prior Publication Data
US 2017/0238184 A1    Aug. 17, 2017

(30) Foreign Application Priority Data
Aug. 20, 2014  (CN) .......................... 2014 1 0415762

(51) Int. Cl.
*H04W 12/08*  (2009.01)
*H04W 12/06*  (2009.01)
(Continued)

(52) U.S. Cl.
CPC ............. *H04W 12/08* (2013.01); *H04W 8/18* (2013.01); *H04W 12/06* (2013.01); *H04W 12/10* (2013.01);
(Continued)

(58) Field of Classification Search
CPC ....... H04W 12/08; H04W 8/18; H04W 12/06; H04W 12/10; H04W 88/10; H04W 84/042; H04L 9/0618
See application file for complete search history.

(56) References Cited

U.S. PATENT DOCUMENTS 9,693,275 B2 *  6/2017  Stojanovski .......... H04W 8/082
9,930,597 B2 *  3/2018  Ahmad ................. H04W 76/10
(Continued)

FOREIGN PATENT DOCUMENTS

CN    101511084 A    8/2009
CN    101640886 A    2/2010
(Continued)

OTHER PUBLICATIONS

"Improved Extensible Authentication Protocol Method for 3rd Generation Authentication and Key Agreement", May 2009, J. Arkko, V, Lehtovirta, Ericsson, P Eronen, Network Working Group, for Comments: 5448, Informational, printed from the Internat at: https://tools.ietf.org/html/rfc5448, 30 pgs.
(Continued)

*Primary Examiner* — Yonas A Bayou
(74) *Attorney, Agent, or Firm* — Ling Wu; Stephen Yang; Ling and Yang Intellectual Property

(57) ABSTRACT

Provided in the embodiments of the present invention are a method for accessing a long-term evolution LTE network, said method being used in an electronic device, said electronic device being in communication with a mobile telephone and LTE network; the method comprises: acquire identity information and authentication information of a mobile telephone; on the basis of the identity information and the authentication information, perform verification of authentication, integrity protection, and ciphering of the mobile telephone; and control the mobile telephone having undergone successful authentication, integrity protection,
(Continued)

and ciphering in accessing the LTE network by means of support of an evolved packet system EPS established by the LTE network; the present invention also discloses an electronic device and a computing storage medium.

15 Claims, 5 Drawing Sheets

(51) Int. Cl.
*H04W 12/10* (2009.01)
*H04W 8/18* (2009.01)
*H04W 88/10* (2009.01)
H04L 9/06 (2006.01)
H04W 84/04 (2009.01)

(52) U.S. Cl.
CPC ........... *H04W 88/10* (2013.01); *H04L 9/0618* (2013.01); *H04W 84/042* (2013.01)

(56) References Cited

U.S. PATENT DOCUMENTS

| | | | |
|---|---|---|---|
| 2012/0215931 A1 | 8/2012 | Touati | |
| 2012/0257598 A1* | 10/2012 | Karampatsis | H04W 8/082 370/331 |
| 2012/0275310 A1* | 11/2012 | Watfa | H04W 8/082 370/238 |
| 2012/0314568 A1* | 12/2012 | Tan | H04W 28/24 370/230 |
| 2013/0121206 A1* | 5/2013 | Turanyi | H04L 47/782 370/254 |
| 2013/0155851 A1 | 6/2013 | Koodli | |
| 2013/0182555 A1* | 7/2013 | Raaf | H04W 36/0033 370/216 |
| 2013/0325700 A1* | 12/2013 | Chakraborty | H04W 12/08 705/39 |
| 2014/0050095 A1* | 2/2014 | Szilagyi | H04L 1/0002 370/236 |
| 2014/0086177 A1* | 3/2014 | Adjakple | H04W 12/08 370/329 |
| 2014/0086211 A1* | 3/2014 | Liu | H04L 45/38 370/331 |
| 2014/0189838 A1 | 7/2014 | Zhao | |
| 2014/0219449 A1* | 8/2014 | Shattil | H04W 12/08 380/270 |
| 2014/0301274 A1 | 10/2014 | Touati et al. | |
| 2015/0146533 A1* | 5/2015 | Enomoto | H04W 28/08 370/235 |

FOREIGN PATENT DOCUMENTS

| | | | |
|---|---|---|---|
| CN | 102551304 A | | 7/2012 |
| CN | 102917354 A | | 2/2013 |
| CN | 103841558 A | * | 6/2014 |
| CN | 103841558 A | | 6/2014 |
| EP | 2296392 A1 | | 3/2011 |
| JP | 2013197874 A | | 9/2013 |

OTHER PUBLICATIONS

International Search Report in international application No. PCT/CN2014/094524, dated May 28, 2015, 2 pgs.
English Translation of the Written Opinion of the International Search Authority in international application No. PCT/CN2014/094524, dated May 28, 2015, 8 pgs.
Supplementary European Search Report in European application No. 14881936.0, dated May 10, 2017, 12 pgs.
"3rd Generation Partnership Project; Technical Specification Group Services System Aspects; 3G Security; Security architecture (Release 12)", 3GPP Standard; 3GPP TS 33.102, 3rd Generation Partnership Project (3GPP), Mobile Competence Centre; 650, Route Des Lucioles ; F-06921 Sophia-Antipolis Cedex ; France, vol. SA W63, No. V12.1.0, Jun. 26, 2014 (Jun. 26, 2014), pp. 1-76.
"3rd Generation Partnership Project; Technical Specification Group Services and System Aspects; 3GPP System Architecture Evolution (SAE); Security architecture (Release 12)", 3GPP Standard; 3GPP TS 33.401, 3rd Generation Partnership Project (3GPP), Mobile Competence Centre ; 650, Route Des Lucioles ; F-06921 Sophia-Antipolis Cedex ; France, vol. SA WG3, No. V12.11.0, Jun. 26, 2014 (Jun. 26, 2014.), 128 pg.
"3rd Generation Partnership Project; Technical Specification Group Services and System Aspects; 3GPP System Architecture Evolution (SAE); Security aspects of non-3GPP accesses (Release 12)", 3GPP Standard; 3GPP TS 33.402, 3rd Generation Partnership Project (3GPP), Mobile Competence Centre ; 650, Route Des Lucioles ; F-06921 Sophia-Antipolis Cedex ;France, vol. SA WG3, No. V12.3.0, Mar. 14, 2014, 56 pgs.

* cited by examiner

METHOD FOR ACCESSING LTE NETWORK, ELECTRONIC DEVICE, AND COMPUTER STORAGE MEDIUM

TECHNICAL FIELD

The disclosure relates to the technology of network access, and in particular to a method for accessing a Long Term Evolution (LTE) network, an electronic device, and a computer storage medium.

BACKGROUND

With the rapid development of the fourth generation (4G) of mobile communication technology, high-speed Internet access speed and convenient network services have been achieved. If users want to enjoy good services brought by 4G, they must buy a mobile phone which supports the LTE standard. According to the survey, there are not many users buying LTE mobile phones currently mainly due to the following aspects: first, LTE mobile phones are relatively expensive so that the scope of its applicable group is smaller; second, the users who just change to use 3G mobile phones will spend efforts and waste resources, to a certain extent, in changing mobile phones once again. Thus, an urgent problem to be solved is how to enable non-LTE mobile phones such as 2G or 3G mobile phones to access the LTE network and then enable their users to enjoy the 4G high-speed service without changing to LTE mobile phones.

SUMMARY

For solving the existing technical problem, embodiments of the disclosure provide a method for accessing the LTE network, an electronic device, and a computer storage medium, which can realize accessing the LTE network, improve the utilization rate of LTE network resources and enhance the user experience without changing to LTE mobile phones.

The technical solutions of the embodiment of the disclosure are implemented as follows.

The embodiments of the disclosure provide a method for accessing the LTE network, which may be applied to an electronic device, herein the method includes that:

identity information and authentication information of the mobile phone are acquired;

authentication, integrity protection and ciphering is performed on the mobile phone based on the identity information and the authentication information; and the mobile phone having undergone successful authentication, integrity protection and ciphering is controlled to access the LTE network by means of an Evolved Packet System (EPS) bearer established by the LTE network.

In the above embodiment, the method may further include that:

the electronic device sends an inquiry instruction in the form of an Attention (AT) instruction to the mobile phone via a preset Wireless Local Area Network (WLAN), Wireless Fidelity (WiFi), infrared or Ultra Wideband (UWB) connection, to acquire the International Mobile Subscriber Identification Number (IMSI) information of the mobile phone, herein the identity information of the mobile phone includes the IMSI information.

In the above embodiment, the step that authentication, integrity protection and ciphering is performed on the mobile phone based on the identity information and the authentication information may include that:

when receiving an authentication request from the LTE network for authenticating the mobile phone having the identity information, the electronic device sends the AT instruction to the mobile phone via the preset WLAN, WiFi, infrared or UWB connection to acquire the authentication information of the mobile phone, herein the authentication information includes: a RESponse (RES), a Cipher Key (CK), and an Integrity Key (IK) calculated by the mobile phone; and when receiving the authentication information returned by the mobile phone, the electronic device saves the CK and the IK, and sends the authentication response to the LTE network, the authentication response carries the RES; and when receiving a Security Mode Command from the LTE network, the electronic device performs integrity verification and ciphering of user plane data and signaling data of the mobile phone by using the CK, the IK, a pre-saved ciphering algorithm and a pre-saved integrity protection algorithm, and upon a successful integrity verification and ciphering, returns a Security Mode Complete message to the LTE network.

In the above embodiment, the method may further include that:

when receiving an Attach Accept message from the LTE network, the electronic device acquires the EPS bearer from the Attach Accept message, and notifies, via the pre-set WLAN, WiFi, infrared or UWB connection, the mobile phone of the EPS bearer so that the mobile phone accesses the LTE network by means of the EPS bearer.

In the above embodiment, the method may further include that:

when receiving a download request from the mobile phone, the electronic device downloads requested data from the LTE network via an LTE-Uu interface between an Evolved Universal Terrestrial Radio Access Network (E-UTRAN) and User Equipment (UE), and returns the requested data to the mobile phone via the pre-set WLAN, WiFi, infrared or UWB connection; and when receiving an upload request from the mobile phone, the electronic device uploads requested data to the LTE network via the LTE-Uu, and returns an acknowledgment message to the mobile phone after completion of the upload.

The embodiments of the disclosure further provide an electronic device, which may include:

a first acquiring unit configured to acquire identity information and authentication information of the mobile phone;

a first processing unit configured to perform authentication, integrity protection and ciphering on the mobile phone based on the identity information and the authentication information; and a first controlling unit configured to control the mobile phone having undergone successful authentication, integrity protection and ciphering to access the LTE network by means of an Evolved Packet System (EPS) bearer established by the LTE network.

In the above embodiment, the first acquiring unit is configured to:

send an inquiry instruction in the form of an AT instruction to the mobile phone via a preset Wireless Local Area Network (WLAN), Wireless Fidelity (WiFi), infrared or Ultra Wideband (UWB) connection, to acquire the International Mobile Subscriber Identification Number (IMSI) information of the mobile phone, herein the identity information of the mobile phone includes the IMSI information.

In the above embodiment, the first processing unit is configured to, when receiving an authentication request from the LTE network for authenticating the mobile phone having the identity information, send the AT instruction to the mobile phone via the preset WLAN, WiFi, infrared or UWB connection to acquire the authentication information of the mobile phone, herein the authentication information includes: a RES, a CK, and an IK calculated by the mobile phone; and the first processing unit is further configured to, when receiving the authentication information returned by the mobile phone, save the CK and the IK, and send the authentication response to the LTE network; the authentication response carries the RES, and when receiving a Security Mode Command from the LTE network, perform integrity verification and ciphering of user plane data and signaling data of the mobile phone by using the CK, the IK, a pre-saved ciphering algorithm and a pre-saved integrity protection algorithm, and upon a successful integrity verification and ciphering, return a Security Mode Complete message.

In the above embodiment, the first controlling unit is configured to:

when receiving an Attach Accept message from the LTE network, acquire the EPS bearer from the Attach Accept message, and notify, via the pre-set WLAN, WiFi, infrared or UWB connection, the mobile phone of the EPS bearer so that the mobile phone accesses the LTE network by means of the EPS bearer.

In the above embodiment, the electronic device further includes a second processing unit configured to:

when receiving a download request from the mobile phone, download requested data from the LTE network via an LTE-Uu interface between an Evolved Universal Terrestrial Radio Access Network (E-UTRAN) and User Equipment (UE), and return the requested data to the mobile phone via the pre-set WLAN, WiFi, infrared or UWB connection; and when receiving an upload request from the mobile phone, upload requested data to the LTE network via the LTE-Uu, and return an acknowledgment message to the mobile phone after completion of the upload.

The embodiments of the disclosure further provide a computer storage medium having stored therein computer-executable instructions configured to execute the abovementioned method for accessing the LTE network.

The embodiment of the disclosure provides a method for accessing the LTE network, an electronic device, and a computer storage medium. The electronic device is in communication with a mobile phone and the LTE network. The method may be applied to the electronic device. The method includes that: identity information and authentication information of the mobile phone are acquired, authentication, integrity protection and ciphering is performed on the mobile phone based on the identity information and the authentication information, and the mobile phone having undergone successful authentication, integrity protection and ciphering is controlled to access the LTE network by means of an Evolved Packet System (EPS) bearer established by the LTE network. With the technical solutions of the embodiments of the disclosure, it is possible to realize accessing the LTE network and acquire the LTE service without changing a non-LTE mobile phone to an LTE mobile phone, thereby improving the utilization rate of LTE network resources and enhancing the user's experience.

DETAILED DESCRIPTION

Preferred embodiments of the disclosure will now be described in detail with reference to the accompanying drawings, and it is to be understood that the preferred embodiments described hereinafter are for the purpose of illustration and explanation only and are not intended to be limiting of the disclosure.

The embodiment of the disclosure provides a method for accessing the LTE network. The method may be applied to an electronic device. The electronic device may be in communication with non-LTE mobile phones such as 3G mobile phones and the LTE network.

Figure 1:
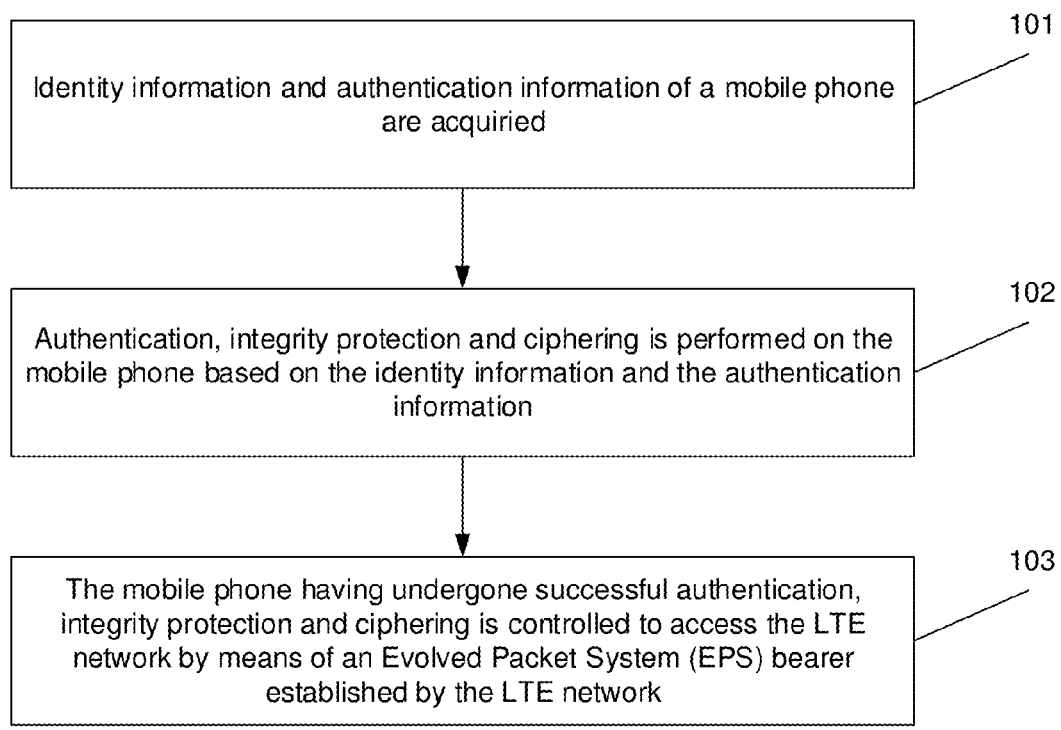
FIG. 1 is a flow schematic diagram of a method for accessing the LTE network provided according to an embodiment of the disclosure.

FIG. 1 is a flow schematic diagram of a method for accessing the LTE network provided according to an embodiment of the disclosure; as shown in FIG. 1, the method includes:

Step 101: identity information and authentication information of a mobile phone are acquired.

Here, the electronic device is in communication with the mobile phone via a preset short-range high-speed wireless communication technology such as WLAN, WiFi, infrared or UWB connection, and sends an inquiry instruction in the form of an Attention (AT) instruction via a WLAN, WiFi, infrared or UWB connection, specifically, sends the inquiry instruction, i.e., AT+CIMI to the mobile phone to acquire the identity information of the mobile phone, and the identity information includes the International Mobile Subscriber Identification Number (IMSI) information of the mobile phone; the mobile phone reads the IMSI from a Universal Subscriber Identity Module (USIM) or Subscriber Identity Module (SIM) card, and sends the IMSI information to the electronic device in a manner such as a preset WLAN; when receiving the IMSI information of the mobile phone, the electronic device initiates a registration request to the LTE network, and the registration request carries the IMSI information of the mobile phone; when receiving the registration request, the LTE network initiates an authentication request to the electronic device; and the electronic device sends the AT+CSIM instruction for the authentication request to the mobile phone in a manner such as a preset WLAN to notify the mobile phone of performing the authentication on the LTE network.

Step 102: authentication, integrity protection and ciphering is performed on the mobile phone based on the identity information and the authentication information.

Here, the authentication request carries a random number (RAND) and an authentication token (ATUN) used for calculating the authentication information by the mobile phone; and when receiving the notification of the electronic device, the mobile phone calculates the authentication information according to the RAND and the self-saved root key Ki, and the authentication information includes a RES, a CK, and an IK, and the like, and sends the authentication information to the electronic device in a manner such as WLAN or WiFi; the electronic device saves the CK and the IK and sends the RES to the LTE network; and when receiving the RES, the LTE network compares the RES with the self-saved reference response parameter, and confirms that the mobile phone has passed the authentication when the RES and the self-saved reference response parameter are the same in the comparison.

When the authentication of the mobile phone by the LTE network is successful, the LTE network initiates a Security Mode Command to the electronic device to notify the electronic device of performing integrity protection and ciphering on the mobile phone; the electronic device performs integrity protection and ciphering on the mobile phone by using the saved CK, IK and the pre-saved ciphering algorithm and integrity protection algorithm, and upon a successful integrity verification and ciphering, returns a Security Mode Complete message to the LTE network.

Step 103: the mobile phone having undergone successful authentication, integrity protection and ciphering is controlled to access the LTE network by means of an Evolved Packet System (EPS) bearer established by the LTE network.

Here, upon successful authentication, integrity protection and ciphering of the mobile phone, the LTE network initiates an Attach Accept message to the electronic device, and the Attach Accept message carries the EPS bearer established by the LTE network for the mobile phone; the electronic device acquires the EPS bearer, and processes the related registration information such as distributing an Internet Protocol (IP) address and a Globally Unique Temporary Identifier (GUTI) for the mobile phone; notifies the mobile phone to use the IP address and the GUTI to access the LTE network in the bearer to complete registration of the electronic device in the LTE network.

In a preferred embodiment of the disclosure, after the mobile phone completes the registration in the LTE network by the electronic device, when receiving a download request from the mobile phone, the electronic device downloads requested data from the LTE network via the radio interface (LTE-Uu) between the E-UTRAN and the UE, and returns the requested data to the mobile phone in a manner of the pre-set WLAN, WiFi, infrared or UWB;

when receiving an upload request from the mobile phone, the electronic device uploads requested data to the LTE network via the LTE-Uu, and returns an acknowledgment message to the mobile phone after completion of the upload.

The technical solutions of the embodiment of the disclosure will be further described with reference to FIGS. 2 to 4.

Figure 2:
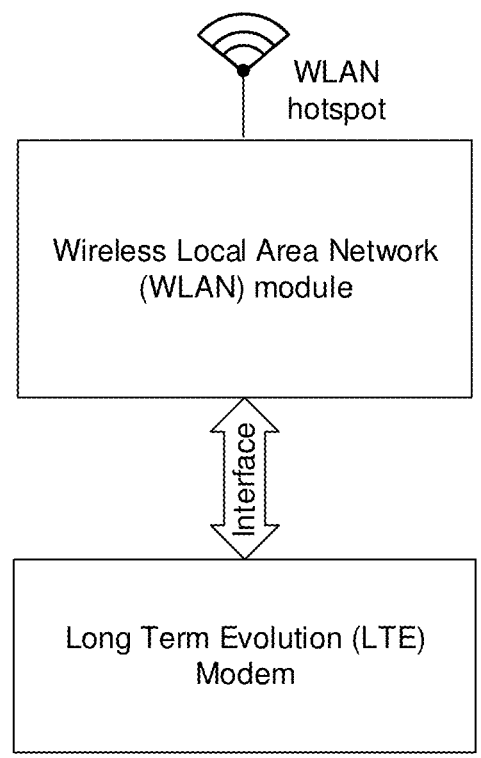
FIG. 2 is a schematic diagram of an application scenario provided according to an embodiment of the disclosure.

As shown in FIG. 2, as an example, a short-range high-speed wireless communication technology is WLAN, and the electronic device communicates with the mobile phone through the WLAN.

Figure 3:
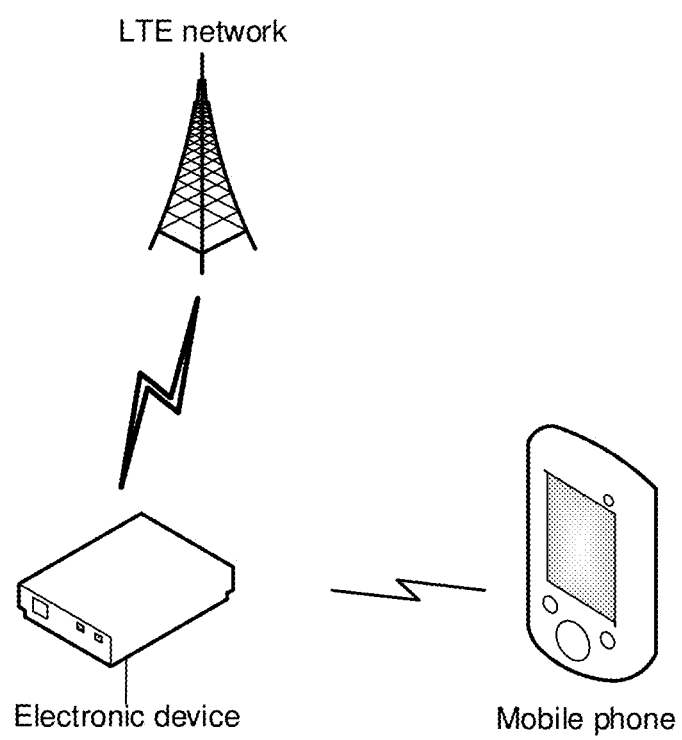
FIG. 3 is a schematic diagram of a hardware structure of an electronic device in the application scenario provided according to an embodiment of the disclosure.

As shown in FIG. 3, the electronic device includes an LTE Modem, a WLAN module, and a communication interface therebetween such as a Com interface.

Figure 4:
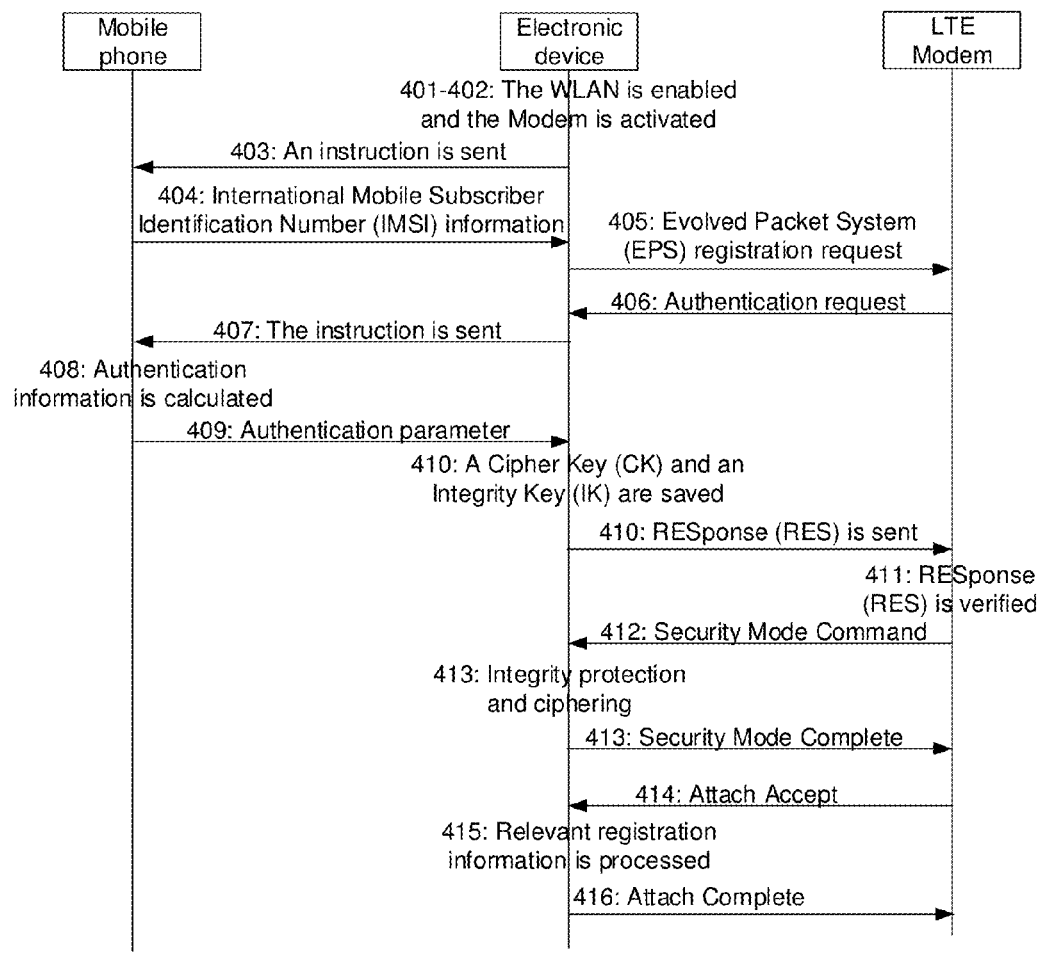
FIG. 4 is a specific flow schematic diagram of a method for accessing the LTE network provided according to an embodiment of the disclosure.

As shown in FIG. 4, the method includes:

Step 401: the WLAN hotspot of the electronic device is configured and the WLAN function of the electronic device is enabled;

Step 402: the LTE Modem of the electronic device is activated so that it can carry on the follow-up work through the WLAN;

Here, the activation may be activated by a manual activation or by a software trigger, and may be set according to a specific practical application.

Step 403: the electronic device, in particular, the LTE Modem, sends the inquiry instruction, i.e., AT+CIMI instruction via the WLAN connection to obtain the IMSI information of the USIM card of the mobile phone;

Step 404: after receiving the AT+CIMI instruction, the mobile phone reads the IMSI information from the USIM card and returns the IMSI information to the electronic device via the WLAN connection;

Step 405: the electronic device, in particular, the LTE MODEM, successfully receives the IMSI information from the mobile phone, and then initiates the EPS registration request to the LTE network.

Here, the EPS registration request carries the IMSI information of the mobile phone USIM card and a CONNECTIVITY REQUEST (PDN).

Step 406: when receiving the EPS registration request, the LTE network initiates an authentication request for authenticating the mobile phone to the electronic device;

Step 407: the electronic device, in particular, the LTE Modem, sends the AT+CSIM instruction to the mobile phone via the WLAN connection to notify the mobile phone of performing authentication on the LTE network.

Here, the AT+CSIM instruction includes the RAND and the ATUN sent to the electronic device by the LTE network and used for calculating the authentication information by the mobile phone.

Step 408: after receiving the AT+CSIM instruction, the mobile phone calculates the authentication information to complete the authentication of the USIM card.

Here, the authentication information is calculated based on the authentication parameters such as the RAND, AUTN, and the self-saved root key Ki by the mobile phone. For details, refer to the related description, and the description will not be repeated here.

Step 409: the mobile phone returns the authentication response and authentication information to the electronic device via the WLAN connection;

Step 410: the electronic device, in particular, the LTE Modem, saves the CK and IK in the authentication information after receiving the authentication response and authentication information, and sends the RES to the LTE network;

Step 411: the LTE network verifies the RES to verify whether the mobile phone with the IMSI is legal; if it is legal, proceed to step 412; otherwise, the flow ends;

Here, the LTE network compares the received RES with the self-saved reference response parameter, and confirms that the mobile phone has passed the authentication when the received RES and the self-saved reference response parameter are the same in the comparison.

Step 412: the LTE network initiates a Security Mode Command to notify the electronic device to initiate an integrity protection and ciphering process.

Step 413: the electronic device, in particular, the LTE Modem, performs the integrity protection and ciphering with the saved CK and IK after receiving the security mode, and returns the Security Mode Complete message to the LTE network after the successful verification.

Here, ciphering and integrity verification are performed on user plane data and signaling data by using the CK, the IK, a pre-saved ciphering algorithm and a pre-saved integrity protection algorithm. For the specific process, refer to the related description, and the description will not be repeated here.

Step 414: the LTE network sends the Attach Accept message to the electronic device for the EPS registration request.

Here, the Attach Accept message carries an active default EPS bearer context request.

Step 415: The electronic device, in particular, the LTE Modem, processes the relevant registration information after receiving the Attach Accept message, and processes the DEFAULT EPS BEARER CONTEXT REQUEST;

Step 416: the electronic device, in particular the LTE Modem, returns an Attach Complete message to the LTE network.

The Attach Complete message carries an active default EPS bearer context accept.

At this point, the mobile phone completes the registration and bearer activation in the LTE network and realizes the interoperability with the LTE network through the electronic device.

Thus, in the embodiment of the disclosure, by means of the assistance of the electronic device, the non-LTE mobile phones can access the LTE network, and processes such as the registration, authentication, integrity protection and ciphering, uploading and downloading of the mobile phone of non-LTE users in the LTE network are completed so that the non-LTE mobile phones acquire LTE services; it is possible to enjoy the LTE service without changing a non-LTE mobile phone to an LTE mobile phone, thereby improving the Internet experience of the users and improving the utilization rate of LTE network resources.

The embodiment of the disclosure also provides a computer storage medium, in which a computer-executable instruction may be stored, the computer-executable instruction being configured to execute the abovementioned method for accessing the LTE network.

Figure 5:
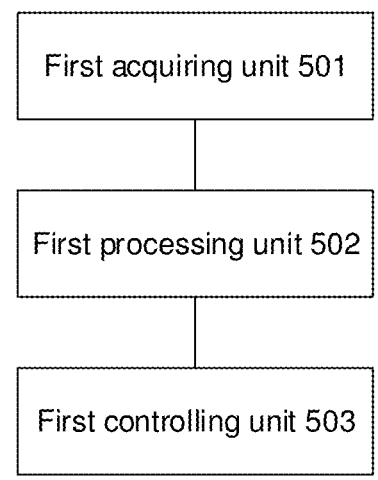
FIG. 5 is a composition and structure schematic diagram of an electronic device provided according to an embodiment of the disclosure.

Based on the method for accessing the LTE network, the embodiment of the disclosure also provides an electronic device; FIG. 5 is a composition and structure schematic diagram of an electronic device provided according to an embodiment of the disclosure; as shown in FIG. 5, the electronic device includes: a first acquiring unit 501, a first processing unit 502 and a first controlling unit 503, in which:

the first acquiring unit 501 is configured to acquire identity information and authentication information of the mobile phone;

the first processing unit 502 is configured to perform authentication, integrity protection and ciphering on the mobile phone based on the identity information and the authentication information; and the first controlling unit 503 is configured to control the mobile phone having undergone successful authentication, integrity protection and ciphering to access the LTE network by means of an EPS bearer established by the LTE network.

The first acquiring unit 501 is configured to send inquiry instructions, i.e., AT and CIMI instructions to the mobile phone via the preset WLAN, WiFi, infrared or UWB connection, to acquire the IMSI information of the mobile phone, herein the identity information of the mobile phone includes the IMSI information.

The first processing unit 502 is configured to, when receiving an authentication request from the LTE network for authenticating the mobile phone having the identity information, send the AT and CIMI instructions to the mobile phone corresponding to the identity information via the preset WLAN, WiFi, infrared or UWB connection to acquire the authentication information of the mobile phone, herein the authentication information includes: a RES, a CK, and an IK calculated by the mobile phone.

The first processing unit 502 is further configured to, when receiving the authentication information returned by the mobile phone, save the CK and the IK, and send the authentication response to the LTE network, herein the authentication response carries the RES; and when receiving the Security Mode Command from the LTE network, perform integrity verification and ciphering of user plane data and signaling data of the mobile phone by using the saved CK, IK and the pre-saved ciphering algorithm and integrity protection algorithm, and upon a successful integrity verification and ciphering, return the Security Mode Complete message.

The first controlling unit 503 is configured to, when receiving an Attach Accept message from the LTE network, acquire the EPS bearer from the Attach Accept message, and notify, via the pre-set WLAN, WiFi, infrared or UWB connection, the mobile phone of the EPS bearer so that the mobile phone accesses the LTE network by means of the EPS bearer.

In a preferred embodiment of the disclosure, the electronic device further includes a second processing unit (not shown in FIG. 5) configured to, when receiving a download request from the mobile phone, download requested data from the LTE network via the LTE-Uu, and return the requested data to the mobile phone via the pre-set WLAN, WiFi, infrared or UWB connection.

The second processing unit is configured to, when receiving an upload request from the mobile phone, upload requested data to the LTE network via the LTE-Uu, and return an acknowledgment message to the mobile phone after completion of the upload.

In a practical application, each of the first acquiring unit 501, the first processing unit 502, the first controlling unit 503, and the second processing unit may be implemented by a Central Processing Unit (CPU), a Digital Signal Processor (DSP), a Micro Processor Unit (MPU), or a Field Programmable Gate Array (FPGA). The CPU, DSP, MPU, and FPGA can each be built in the electronic device.

It will be understood by those skilled in the art that the implementation functions of the processing units in the electronic device shown in FIG. 5 may be understood with reference to the foregoing relevant description of the method for accessing the LTE network. It will be understood by those skilled in the art that the functions of the processing units in the electronic device shown in FIG. 5 may be implemented by a program running on a processor or by a specific logic circuit.

Those skilled in the art should know that the embodiment of the disclosure may be provided as a method, a system or a computer program product. Therefore, the disclosure may adopt a form of hardware embodiment, software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiment of the disclosure and not intended to limit the scope of patent of the disclosure.

INDUSTRIAL APPLICABILITY

The embodiment of the disclosure discloses a method for accessing a Long Term Evolution (LTE) network. The electronic device acquires identity information and authentication information of the mobile phone, performs authentication, integrity protection and ciphering on the mobile phone based on the identity information and the authentication information, and controls the mobile phone having undergone successful authentication, integrity protection and ciphering to access the LTE network by means of an Evolved Packet System (EPS) bearer established by the LTE network. With the technical solutions of the embodiment of the disclosure, it is possible to realize accessing the LTE network and acquire the LTE service without changing a non-LTE mobile phone to an LTE mobile phone, thereby improving the utilization rate of the LTE network resource and enhancing the user experience.

What is claimed is:

1. A method for accessing a Long Term Evolution (LTE) network, applied to an electronic device that is in communication with a mobile phone and the LTE network, comprising:
    acquiring identity information and authentication information of the mobile phone;
    performing authentication, integrity protection and ciphering on the mobile phone based on the identity information and the authentication information; and
    controlling the mobile phone having undergone successful authentication, integrity protection and ciphering to access the LTE network by means of an Evolved Packet System (EPS) bearer established by the LTE network,
    wherein performing authentication, integrity protection and ciphering on the mobile phone based on the identity information and the authentication information, comprises:
    when receiving an authentication request from the LTE network for authenticating the mobile phone having the identity information, sending, by the electronic device, the AT instruction to the mobile phone via the preset WLAN, WiFi, infrared or UWB connection to acquire the authentication information of the mobile phone, wherein the authentication information comprises: a response parameter (RES), a Cipher Key (CK), and an Integrity Key (IK) calculated by the mobile phone; and
    when receiving the authentication information returned by the mobile phone, saving, by the electronic device, the CK and the IK, and sending the RES to the LTE network; and when receiving a Security Mode Command from the LTE network, performing, by the electronic device, integrity verification and ciphering of user plane data and signaling data of the mobile phone by using the CK, the IK, a pre-saved ciphering algorithm and a pre-saved integrity protection algorithm, and upon a successful integrity verification and ciphering, returning a Security Mode Complete message to the LTE network.

2. The method according to claim 1, further comprising:
sending, by the electronic device, an inquiry instruction in the form of an Attention (AT) instruction to the mobile phone via a preset Wireless Local Area Network (WLAN), Wireless Fidelity (WiFi), infrared or Ultra Wideband (UWB) connection, to acquire the International Mobile Subscriber Identification Number (IMSI) information of the mobile phone,
wherein the identity information of the mobile phone comprises the IMSI information.

3. The method according to claim 2, further comprising:
when receiving an Attach Accept message from the LTE network, acquiring, by the electronic device, the EPS bearer from the Attach Accept message, and notifying, via the pre-set WLAN, WiFi, infrared or UWB connection, the mobile phone of the EPS bearer so that the mobile phone accesses the LTE network by means of the EPS bearer.

4. The method according to claim 3, further comprising:
when receiving a download request from the mobile phone, downloading, by the electronic device, requested data from the LTE network via an LTE-Uu interface between an Evolved Universal Terrestrial Radio Access Network (E-UTRAN) and User Equipment (UE), and returning the requested data to the mobile phone via the pre-set WLAN, WiFi, infrared or UWB connection;
when receiving an upload request from the mobile phone, uploading, by the electronic device, requested data to the LTE network via the LTE-Uu, and returning an acknowledgment message to the mobile phone after completion of the uploading.

5. The method according to claim 1, further comprising:
when receiving an Attach Accept message from the LTE network, acquiring, by the electronic device, the EPS bearer from the Attach Accept message, and notifying, via the pre-set WLAN, WiFi, infrared or UWB connection, the mobile phone of the EPS bearer so that the mobile phone accesses the LTE network by means of the EPS bearer.

6. The method according to claim 5, further comprising:
when receiving a download request from the mobile phone, downloading, by the electronic device, requested data from the LTE network via an LTE-Uu interface between an Evolved Universal Terrestrial Radio Access Network (E-UTRAN) and User Equipment (UE), and returning the requested data to the mobile phone via the pre-set WLAN, WiFi, infrared or UWB connection;
when receiving an upload request from the mobile phone, uploading, by the electronic device, requested data to the LTE network via the LTE-Uu, and returning an acknowledgment message to the mobile phone after completion of the uploading.

7. An electronic device in communication with a mobile phone and a Long Term Evolution (LTE) network, comprising:
a memory storing processor-executable instructions; and
a processor arranged to execute the stored processor-executable instructions to perform steps of:
acquiring identity information and authentication information of the mobile phone;
performing authentication, integrity protection and ciphering on the mobile phone based on the identity information and the authentication information; and
controlling the mobile phone having undergone successful authentication, integrity protection and ciphering to access the LTE network by means of an Evolved Packet System (EPS) bearer established by the LTE network,
wherein performing authentication, integrity protection and ciphering on the mobile phone based on the identity information and the authentication information, comprises:
when receiving an authentication request from the LTE network for authenticating the mobile phone having the identity information, sending the AT instruction to the mobile phone via the preset WLAN, WiFi, infrared or UWB connection to acquire the authentication information of the mobile phone, wherein the authentication information comprises: a response parameter (RES), a Cipher Key (CK), and an Integrity Key (IK) calculated by the mobile phone; and
when receiving the authentication information returned by the mobile phone, saving the CK and the IK, and sending the RES to the LTE network; and when receiving a Security Mode Command from the LTE network, performing integrity verification and ciphering of user plane data and signaling data of the mobile phone by using the CK, the IK, a pre-saved ciphering algorithm and a pre-saved integrity protection algorithm, and upon a successful integrity verification and ciphering, returning a Security Mode Complete message.

8. The electronic device according to claim 7, wherein the processor is arranged to execute the stored processor-executable instructions to further perform a step of:
sending an inquiry instruction in the form of an Attention (AT) instruction to the mobile phone via a preset Wireless Local Area Network (WLAN), Wireless Fidelity (WiFi), infrared or Ultra Wideband (UWB) connection, to acquire the International Mobile Subscriber Identification Number (IMSI) information of the mobile phone,
wherein the identity information of the mobile phone comprises the IMSI information.

9. The electronic device according to claim 8, wherein the processor is arranged to execute the stored processor-executable instructions to further perform a step of:
when receiving an Attach Accept message from the LTE network, acquiring the EPS bearer from the Attach Accept message, and notifying, via the pre-set WLAN, WiFi, infrared or UWB connection, the mobile phone of the EPS bearer so that the mobile phone accesses the LTE network by means of the EPS bearer.

10. The electronic device according to claim 9, wherein the processor is arranged to execute the stored processor-executable instructions to further perform a step of:
when receiving a download request from the mobile phone, downloading requested data from the LTE network via an LTE-Uu interface between an Evolved Universal Terrestrial Radio Access Network (E-UTRAN) and User Equipment (UE), and returning the requested data to the mobile phone via the pre-set WLAN, WiFi, infrared or UWB connection;
when receiving an upload request from the mobile phone, uploading requested data to the LTE network via the LTE-Uu, and returning an acknowledgment message to the mobile phone after completion of the uploading.

11. The electronic device according to claim 7, wherein the processor is arranged to execute the stored processor-executable instructions to further perform a step of:
when receiving an Attach Accept message from the LTE network, acquiring the EPS bearer from the Attach Accept message, and notifying, via the pre-set WLAN, WiFi, infrared or UWB connection, the mobile phone of the EPS bearer so that the mobile phone accesses the LTE network by means of the EPS bearer.

12. The electronic device according to claim 11, wherein the processor is arranged to execute the stored processor-executable instructions to further perform a step of:
when receiving a download request from the mobile phone, downloading requested data from the LTE network via an LTE-Uu interface between an Evolved Universal Terrestrial Radio Access Network (E-UTRAN) and User Equipment (UE), and returning the requested data to the mobile phone via the pre-set WLAN, WiFi, infrared or UWB connection;
when receiving an upload request from the mobile phone, uploading requested data to the LTE network via the LTE-Uu, and returning an acknowledgment message to the mobile phone after completion of the uploading.

13. A non-transitory computer storage medium having stored therein computer-executable instructions configured to execute a method for accessing a Long Term Evolution (LTE) network, applied to an electronic device that is in communication with a mobile phone and the LTE network, the method comprising:
acquiring identity information and authentication information of the mobile phone;
performing authentication, integrity protection and ciphering on the mobile phone based on the identity information and the authentication information; and
controlling the mobile phone having undergone successful authentication, integrity protection and ciphering to access the LTE network by means of an Evolved Packet System (EPS) bearer established by the LTE network,
wherein performing authentication, integrity protection and ciphering on the mobile phone based on the identity information and the authentication information, comprises:
when receiving an authentication request from the LTE network for authenticating the mobile phone having the identity information, sending, by the electronic device, the AT instruction to the mobile phone via the preset WLAN, WiFi, infrared or UWB connection to acquire the authentication information of the mobile phone, wherein the authentication information comprises: a response parameter (RES), a Cipher Key (CK), and an Integrity Key (IK) calculated by the mobile phone; and when receiving the authentication information returned by the mobile phone, saving, by the electronic device, the CK and the IK, and sending the RES to the LTE network; and when receiving a Security Mode Command from the LTE network, performing, by the electronic device, integrity verification and ciphering of user plane data and signaling data of the mobile phone by using the CK, the IK, a pre-saved ciphering algorithm and a pre-saved integrity protection algorithm, and upon a successful integrity verification and ciphering, returning a Security Mode Complete message to the LTE network.

14. The non-transitory computer storage medium according to claim 13, wherein the method further comprises:

sending, by the electronic device, an inquiry instruction in the form of an Attention (AT) instruction to the mobile phone via a preset Wireless Local Area Network (WLAN), Wireless Fidelity (WiFi), infrared or Ultra Wideband (UWB) connection, to acquire the International Mobile Subscriber Identification Number (IMSI) information of the mobile phone, wherein the identity information of the mobile phone comprises the IMSI information.

15. The non-transitory computer storage medium according to claim 13, wherein the method further comprising:

when receiving an Attach Accept message from the LTE network, acquiring, by the electronic device, the EPS bearer from the Attach Accept message, and notifying, via the pre-set WLAN, WiFi, infrared or UWB connection, the mobile phone of the EPS bearer so that the mobile phone accesses the LTE network by means of the EPS bearer.

* * * * *